United States Patent

Saunders et al.

[11] Patent Number: 4,549,754
[45] Date of Patent: Oct. 29, 1985

[54] TOOL JOINT

[75] Inventors: Donna D. Saunders; Manmohan S. Kalsi; Gun-Shing Chen, all of Houston, Tex.

[73] Assignee: Reed Tubular Products Company, Sugar Land, Tex.

[21] Appl. No.: 505,948

[22] Filed: Jun. 20, 1983

[51] Int. Cl.[4] ............................................. F16L 25/00
[52] U.S. Cl. ................................. 285/334; 285/334.4; 411/411; 411/423; 411/308
[58] Field of Search ............... 285/334, 333, 390, 355, 285/334.4; 411/308, 309, 310, 311, 411, 426, 436, 423

[56] References Cited

U.S. PATENT DOCUMENTS

| 597,000 | 1/1898 | Higbee | 411/309 |
| 658,087 | 9/1900 | Higbee | 285/334 |
| 1,870,380 | 8/1932 | Peters et al. | 411/308 |
| 2,532,632 | 12/1950 | MacArthur | 285/55 |
| 3,050,318 | 8/1962 | Van Der Wissel | 285/334 |
| 3,388,935 | 5/1965 | Hjalsten et al. | 285/334 |
| 3,882,917 | 5/1975 | Orlomoski | 411/309 |
| 4,113,290 | 9/1978 | Miida | 285/355 |
| 4,295,751 | 10/1981 | Holmberg | 285/334 |

FOREIGN PATENT DOCUMENTS 0629837 9/1949 United Kingdom ................. 285/390

OTHER PUBLICATIONS

"Product Engineering", Apr. 1979, World of Self-Locking Screws Grows-Frank Yeaple pp. 55-59, (FIGS. 5-8).

Primary Examiner—Cornelius J. Husar
Assistant Examiner—Eric K. Nicholson
Attorney, Agent, or Firm—Norvell & Associates

[57] ABSTRACT

A tool joint in which different tapers on the threads result in an artificial change in pitch and a radial interference and an asymmetric root cut on a larger radius than conventional API threads together with the effect of the tapered thread engagement reduces maximum stress in the thread roots and prevents over-torquing.

7 Claims, 14 Drawing Figures

PEAK SURFACE STRESS DISTRIBUTION FOR THE
FIRST TWO PIN THREADS DUE TO MAKE UP TORQUE

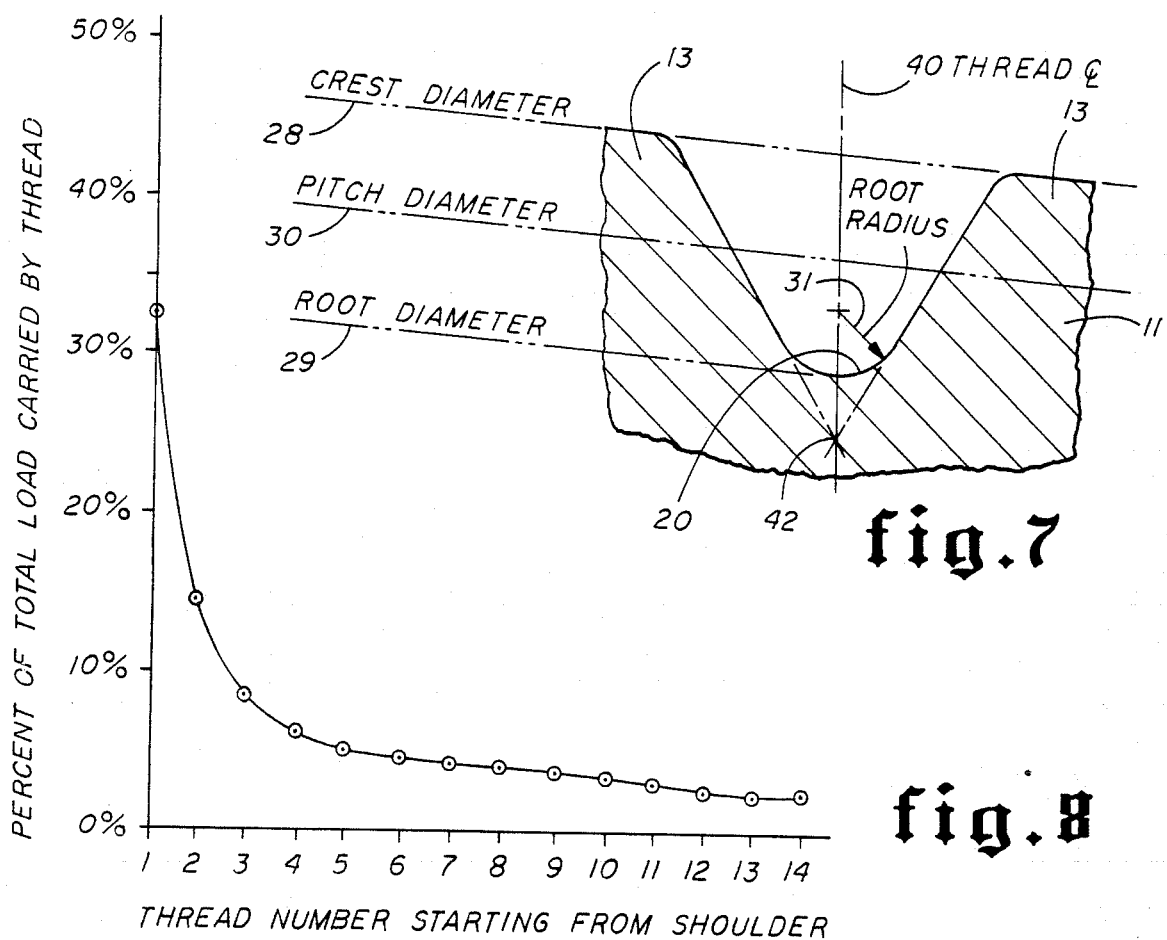
fig.7
fig.8
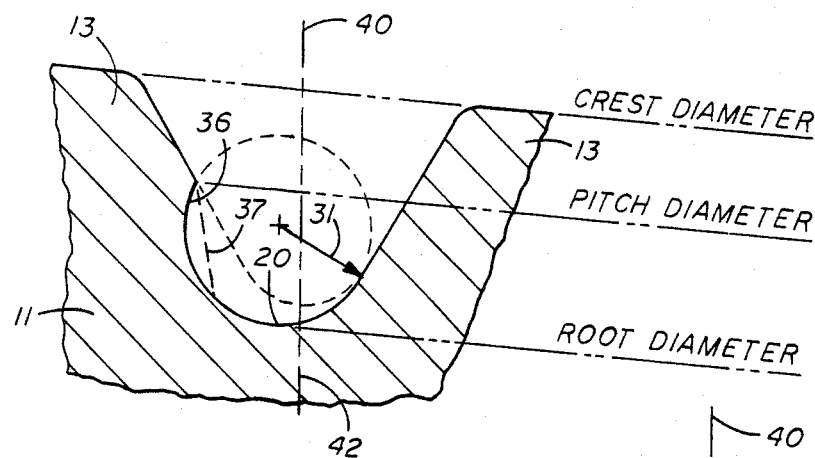
fig.10
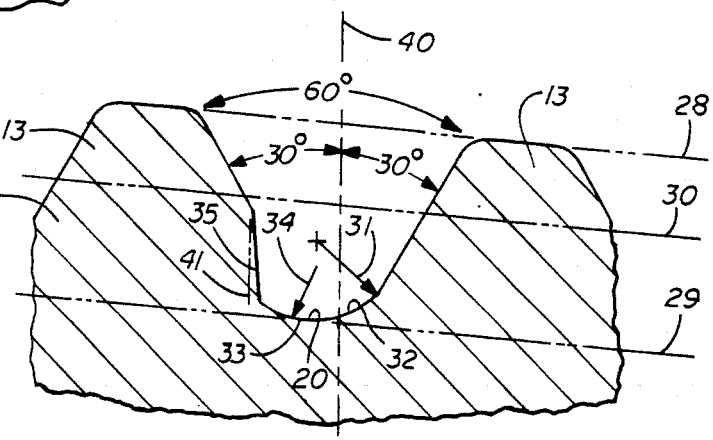
fig.9

4,549,754

TOOL JOINT

BACKGROUND OF THE INVENTION

1. Field of the Invention

This invention relates to new and useful improvements in threaded tool joints for connecting pipe together and more particularly to a tool joint having low stress, and reduced susceptibility to fatigue failure and to over-torquing during use.

2. Brief Description of the Prior Art

Threaded tool joints for connecting pipe together are commonly used in drilling operations in the petroleum industry. These tool joints consist of a male pin member which makes up into a female box member. One of the major problems with tool joints is the failure of the joint as a result of fatigue after an extended period of use.

"Tool joint", as used herein, is any threaded connection in a drill string used for petroleum or mining purposes, such as intergal or welded on joints, drill collars, stabilizers, reamers, etc.

Previous methods of solving the fatigue problem with threaded tool joints have involved principally the use of surface peening methods and also stress relief grooves introduced near the shoulder of the pin. These methods have some limited success but generally are concerned with the effect of high stress concentrations in such regions as the thread root and shoulder to land interface.

Higbee U.S. Pat. No. 658,087 discloses a tapered threaded coupling which produces a jamming union when coupled with other threaded members.

Van Der Wissel U.S. Pat. No. 3,050,318 discloses a box and pin type threaded joint in which the bearing face of the threads changes along the length of the threaded joint.

Hjalsten U.S. Pat. No. 3,388,935 discloses a threaded drill rod element having a shallow thread which varies in the amount of force applied to the threads along the length thereof.

Miida U.S. Pat. No. 4,113,290 shows a threaded connection for large diameter casing in which the thread taper and the thread profile changes the point of application of pressure along the length of the thread.

Holmberg U.S. Pat. No. 4,295,751 discloses still another threaded connection in which the threads are designed to vary the amount of force applied on the individual threads. This threaded connection is designed for use in a percussion drill.

Over torquing of the tool joint in use is a problem in some formations. It has been suggested to utilize a second pair of shoulders which abut at approximately full make up of the joint to greatly increase the torque needed to over-torque the joint. See McArthur U.S. Pat. No. 2,532,632. This requires careful machining of a second pair of shoulders at close tolerance.

SUMMARY OF THE INVENTION

One of the objects of this invention is to provide a new and improved threaded tool joint characterized by low stress and reduced susceptibility to fatigue failure when made up tight.

Another object of this invention is to provide an improved tool joint having a tapered pin with a relieved thread root which results in lower local stresses and reduce susceptibility to fatigue failure.

Another object of this invention is to provide a new and improved threaded tool joint having a tapered thread configuration which distributes the stresses over a larger number of threads.

Still another object of this invention is to provide a new and improved tool joint having a tapered threaded pin with a thread configuration providing for more even distribution of load and reduced susceptibility to fatigue failure and which fits a standard API box thread.

Another object is to provide a new and improved threaded tool joint in which over-torquing during use is prevented by creating a radial interference of the pin threads into the box threads during make up of the joint.

Other objects of this invention will become apparent from time to time throughout the specification and claims as hereinafter related.

BRIEF DESCRIPTION OF THE DRAWINGS

FIG. 7 is a view in section of a basic API thread form for purposes of establishing nomenclature;

FIG. 8 is a theoretical graph or load distribution curve showing the distribution of load by thread number starting from the shoulder of the pin;

FIG. 9 is a sectional view of a pin thread modified in accordance with this invention to provide stress relief at the thread root;

FIG. 10 is a sectional view of a pin thread, substantially as shown in FIG. 9, illustrating the maximum desired amount of relief at the thread root;

DESCRIPTION OF THE PREFERRED EMBODIMENT

This invention relates to new and useful improvements in tool joints for connecting pipe together, and particularly pipe used in the drilling operations in the petroleum industry. A tool joint connector consists of a male pin member which makes up into a female box member. The separate components of the tool joint may be welded to drill pipe and provide the connections for assembling the pipe together. The invention is particularly concerned with an improved design which reduces the susceptibility of the tool joint pins to fatigue failure and prevents over-torquing of the joint during use.

Figure 1:
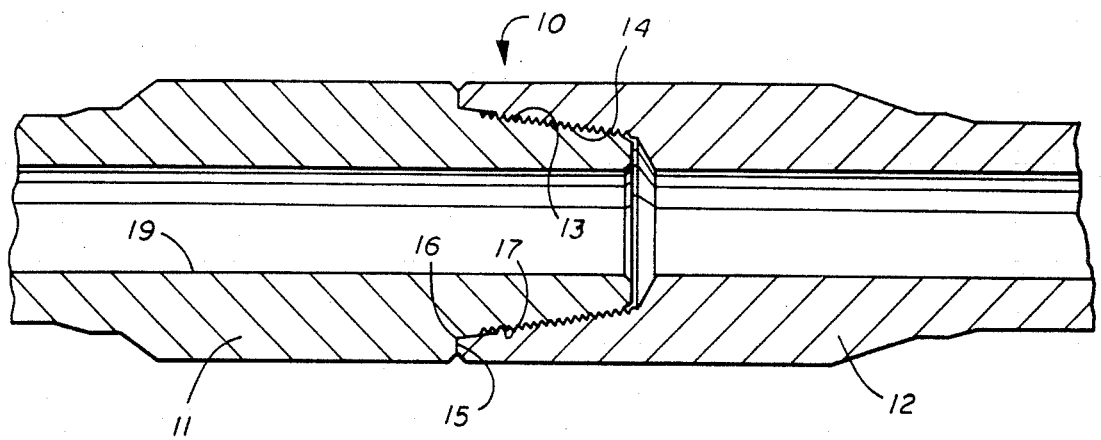
FIG. 1 is a view in longitudinal section of a typical prior art tool joint.

Referring to the drawings by numerals of reference, and more particularly to FIG. 1, there is shown a typical prior art tool joint 10 consisting of a tubular pin member 11 and a tubular box member 12. The pin member 11 has a tapered, threaded pin portion 13 which makes up into a tapered threaded box portion 14 on box member 12. The threaded connection is customarily made up tight so that the shoulder 15 on pin member 11 makes a tight engagement with the end face 16 of the box member 12. Additional details of the prior art pipe tool joint connection are shown in FIGS. 2, 3, 4, 5, 6, 7 and 8.

Figure 3:
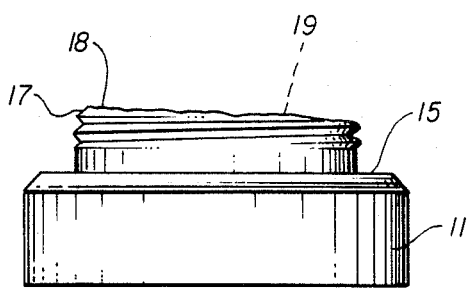
FIG. 3 is a reproduction of a photograph of a fatigue break in a prior art tool joint as seen from the side.
Figure 4:
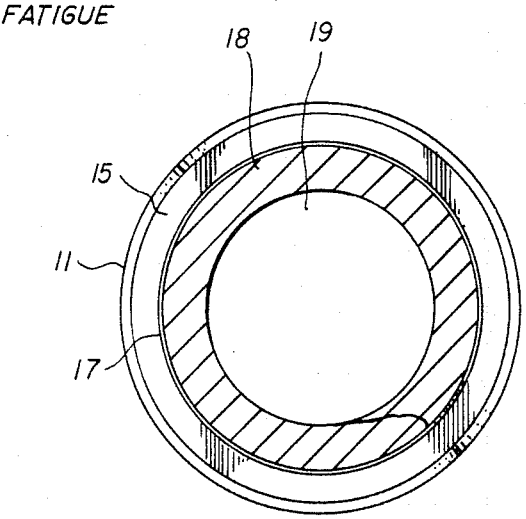
FIG. 4 is a reproduction of a photograph of the fatigue break of the tool joint shown in FIG. 3 as seen from the end.

In a tightly made up tool joint as shown in FIG. 1, most fatigue failures occur at the last engaged thread of the pin approximately three-fourths inch from the shoulder. In FIG. 1 the fatigue break line would start at about 17 on the thread of the pin. In FIGS. 3 and 4 pin member 11 is shown with a fatigue break along the line 18 from about thread 17. Typically, a fatigue failure begins at the root radius of the last engaged thread and over a period of time, depending upon the severity of use, a crack will propagate from this root region toward the bore 19 of the pin until failure occurs. In FIGS. 3 and 4 the fatigue crack and break line is shown in a photographic view of the broken pin.

Current theory with respect to fatigue failures suggests that such failures result from a cyclic plastic flow. The highly loaded thread develops hairline cracks in a high stress region at the root of the threads and the cracks are propagated to lower stress regions over a period of time as a result of periodic applications of stresses during the normal operation of the tool. It would seem then that the susceptibility of fatigue failure could be lowered by reducing the local stress intensity at the thread roots of the pin thread. In the prior art methods of solving the problem of fatigue failure in tool joints took a substantially different approach. Prior art methods involved the use of surface peening methods (e.g. Hi-Flex threads) and also stress relief grooves provided near the shoulder of the pin. These approaches have had only limited success since they generally deal with the effect of high stress concentration in such regions as the thread root and shoulder to land interface. The preferred embodiment of this invention is directed to solving the cause of the stress concentrations and reduces the stress concentrations drastically by specific geometric changes in the thread structure and engagement of the threads which not only aids in reducing stress concentration, but also inhibits over-torquing during use.

In API specification for Rotary Drilling Equipment (API Spec 7 Thirty-Third Edition December 1981), issued by the American Petroleum Institute, Production Department, 211 North Ervay, Suite 1700, Dallas, Tex. 75201, there are set forth the industry standards and specifications for rotary drilling equipment and various components thereof. Section 9, pages 23-25, of the API specification covers Rotary Shouldered Connections. This section deals with the specification for threaded connections as used in tool joints for drill pipe. Sections 10-12, pages 26-32, cover Gaging Practice, Gage Specification and Gage Certification for Rotary Shouldered Connections. Section 9 of the API specification gives the detailed dimensions of thread size and taper for API threaded connections for rotary shouldered connections.

Figure 2:
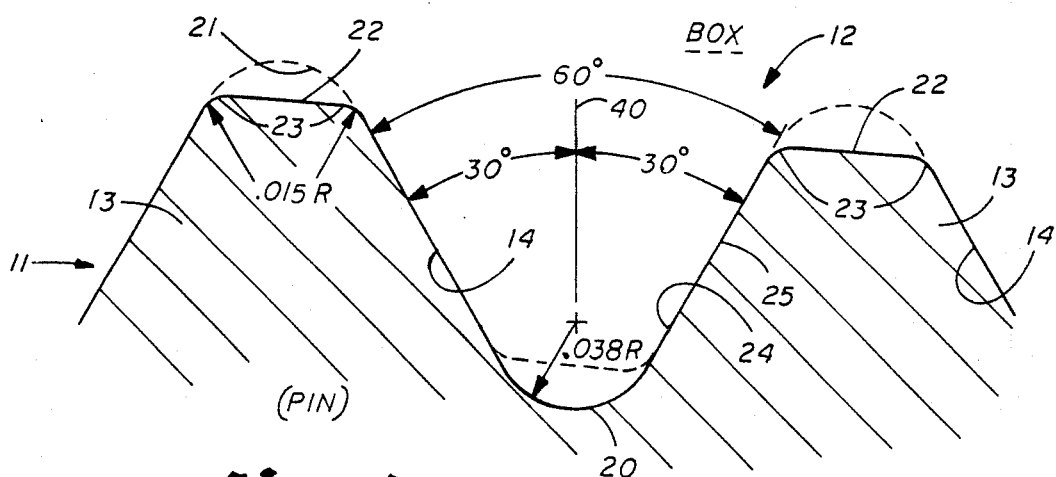
FIG. 2 is an enlarged view in cross-section of the threaded connection of the prior art tool joint shown in FIG. 1.

In FIG. 2 there is shown a typical oil field tool joint thread form which is the API numbered connection with V.038R thread form having a taper of two inches per foot and four threads per inch. In the standard API thread the thread form geometry is equally distributed about a centerline through the thread root which is perpendicular to the thread axis and no compensation is made for the load side of the thread. This is seen in FIG. 2. In the thread form shown in FIG. 2 (API standard thread V.038R) the pin 11 has threads 13 shown fitted into the threads 14 of box member 12 (roots and crest shown in phantom). The root 20 between pin threads 13 is shown to be at the base of a sixty degree angle between the adjacent thread walls. The thread walls are distributed uniformly thirty degrees on either side of a vertical line (thread centerline) running through the center of the thread. The root of this particular thread has a radius of 0.038 inches about a center lying on the thread centerline. The root is truncated 0.038 inches. The root 21 of the box threads 14 has a radius which is substantially the same as the root 20 of the pin threads 13. Pin threads 13 are truncated as indicated at 22 with edge or corner radiuses 23 having a length of about 0.015 inches.

Figure 5:
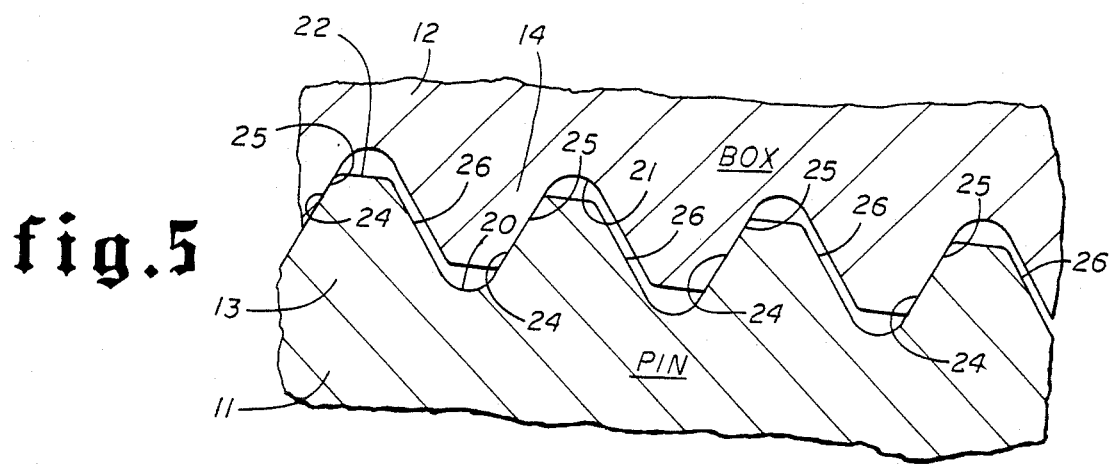
FIG. 5 is a detail, enlarged sectional view of a prior art threaded tool joint connection shown in exaggerated form the tendency to load the leading edge and unload the trailing edge of the thread when fully made up.

When this standard API thread is loaded by tightening the joint, the load flank 24 is placed under compression against the flank 25 of box thread 14 and the unloaded flank 26 of the pin thread 13 becomes relatively unloaded. This is shown in FIG. 5 in a somewhat exaggerated showing of the clearance between the unloaded flank 26 and the adjacent unloaded flank of the box thread 14.

Figure 6:
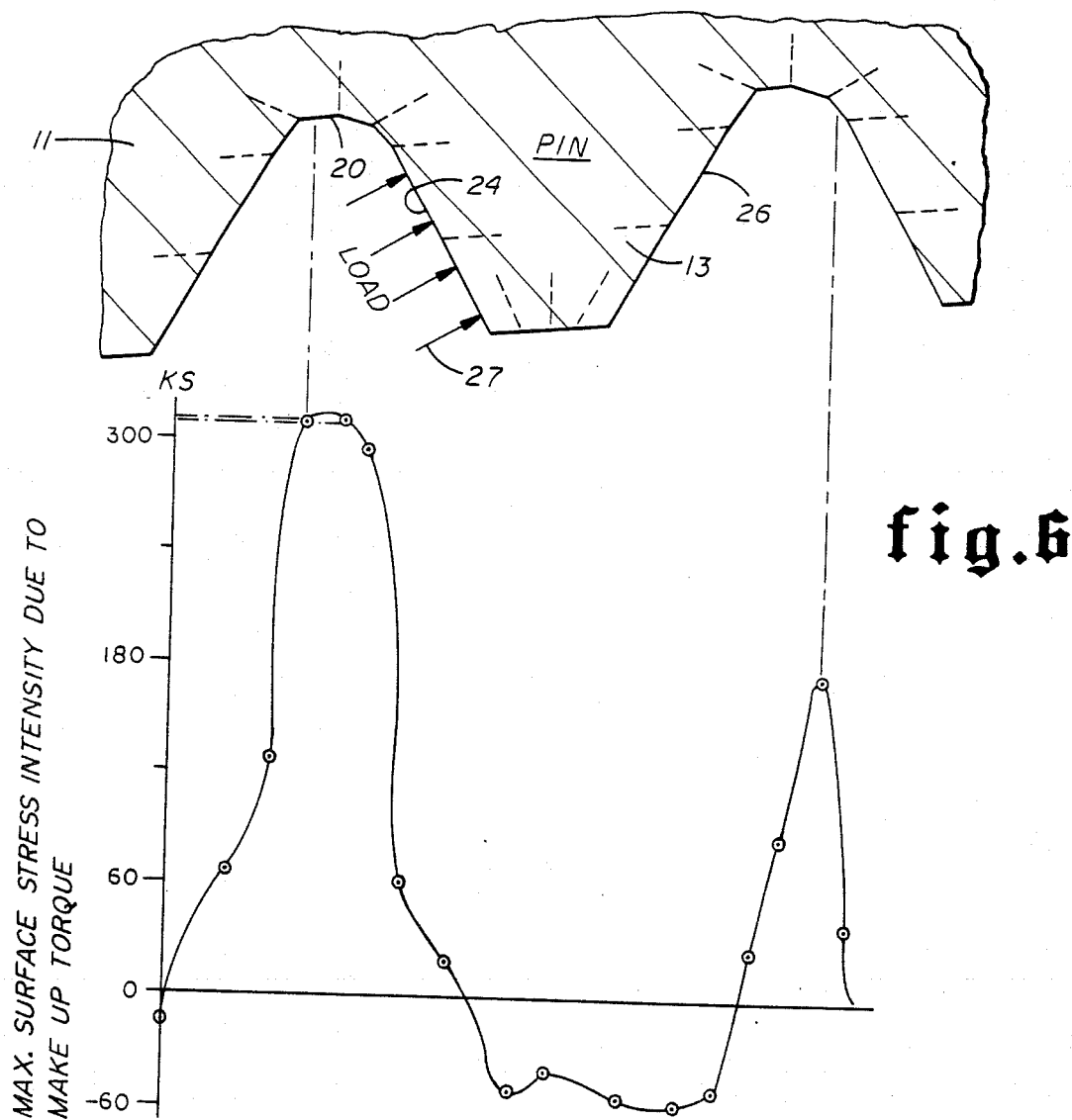
FIG. 6 is an enlarged view of the pin thread shown in FIG. 5 with a theoretical graph or plot of the distribution of stresses linearly along the threads.

In FIG. 6 the calculated consequences of this nonuniform loading of the cross-section of the first two pin threads becomes apparent. In the upper portion of FIG. 6 the application of load to the pin load flank 24 is shown along load lines 27. In the stress distribution curve or graph set forth at the bottom of FIG. 6 the maximum calculated surface stress intensity is plotted for various points along the surface of the pin thread. From the stress distribution curve, it is seen that the stress ranges from 0 or less on the unloaded side 26 of the thread up to a maximum at the root 20 of the thread. The loading of the thread cross-section develops a highly asymmetric stress distribution at the thread root 20. With these asymmetric stress distributions on the threaded root, the cyclic application of forces to the threaded joint in the normal use of the drill string will ultimately cause cracks to start and propagate from the thread root. This ultimately results in a fatigue break as shown in FIGS. 3 and 4.

As a result of the study of stress distributions in the pin threads and the fact that the loading flank of the pin threads becomes substantially loaded while the unloaded flank becomes unloaded, it was concluded that certain modifications could be made in the thread form to produce a thread design which would have a more uniform distribution of stresses and of thread loading.

In a standard API thread (FIG. 7) the pin member 11 has threads 13 which have a crest diameter indicated by the dotted line 28 and a root diameter indicated by the dotted line 29. The pitch diameter is indicated by dotted line 30. The radius is indicated by the line 31 which represents the radius of the root 20 of the thread 13. The center of radius line 31 lies on the thread centerline 40 which is perpendicular to the thread axis and to the central axis of the pin. The crest, pitch, and root diameter line are parallel and indicate the taper of the threads. The root is truncated the distance from point 42 to root diameter 29. When this standard thread is fully made up with the shoulder 15 of the pin member 11 engaging the end face 16 of the box member 12, a highly asymmetric distribution of load is carried on the pin threads. In FIG. 8 the theoretical percentage of total load carried by the threads is plotted against the thread number starting from the shoulder. The thread loading distribution is nonlinear and almost sixty percent of the load is carried on the first three threads and the remainder of the load is carried on the next eleven threads. With this exceptionally high loading near the shoulder 15, it is not surprising that the region of the first and second thread is the point where most fatigue failure occurs.

In modifying the API thread to make a low stress thread, several changes are preferably made. First, the modified thread on the pin preferably is capable of mating with a standard API box thread since the modified pin thread preferably is compatible with the box threads on equipment already present in the field. Next, it is preferred to modify the radius of the pin threads to relieve the stress at the root of the threads. Third, it is preferred to modify the thread taper to create an artificial pitch difference between the pin and box member and provide for a more even distribution of loading of the thread when fully made up. Fourth, this new geometry preferably creates a radial interference starting from the threads remote from the shoulder to prevent over-torquing.

The first modification of the thread structure to be considered is the modification of the root radius. This is illustrated in FIGS. 9 and 10 of the drawing and to some extent in FIG. 14. In the modified thread structure the root radius indicated by arrow 31 at the root 20 of the pin threads 13 is increased approximately fifty percent. Where the root radius 31 of a typical standard API thread for four threads per inch and two inches taper per foot may be 0.038 inches, the root radius in the modified thread structure shown in FIG. 9 is preferably 0.057 inches. This enlarged and gentler curve 32 in the root portion 20 may continue or may blend smoothly into another curve 33 of substantially shorter radius 34. In this case radius 31, which is 0.057 inches, blends into radius 34, which is 0.032 inches. The shorter radius curve or the single radius curve 33 is terminated at a flat surface 35 which diverges outwardly at an angle of about five degrees from a plane normal to the thread axis to a point where it engages or intersects the normally sloping wall of the unloaded thread.

Thus the radius preferably does not extend beyond a plane 41 (FIG. 9) parallel to the thread centerline and passing through the unloaded flank on the root side of the pitch diameter of the unloaded flank. To provide for wear of tools the line 35 between the root and unloaded flank preferably diverges outwardly at about a five degree angle to the thread centerline.

It should be noted that any substantial increase in root radius of the root 20 of an API thread will have some effect in reducing the localization of force or stress at the root of the thread.

In the conventional API thread planes forming extensions of the opposing flanks intersect the thread centerline at 42 (FIG. 7). API specifications call for truncation of the root by providing a root radius equal to the distance between the root diameter 29 and point 42. In other words, the selected root radius and root truncation are equal and the center of the root radius lies on the thread centerline 40. For instance, in the V.038R thread form, both the root truncation and root radius are 0.038 inches.

In accordance with this invention the root radius 31 is greater and preferably substantially greater than the root truncation. Further, to provide that the load flank be tangent to the root radius, the center of the radius will lie on the unloaded flank side of the thread centerline. Any increase of the root radius over root truncation will result in a decrease in maximum stress and a substantial increase such as 0.057 inches for the V.038R thread form is preferred to obtain a substantial decrease in maximum stress. This larger root radius should extend to at least the thread centerline 40 and preferably extends to the root diameter 29 of the thread as shown in FIG. 10.

The thread form described could only be used for the last engaged thread on the pin or for any one or more complete threads. It is preferred that the entire pin thread be of this form. There are, however, limitations to the amount of increase in root radius which is possible.

The root radius may not be increased to the extent that it reduces the distance from the root of the thread to the bore of the tool joint substantially since this will result in a substantial weakening of the tool joint from the loss of metal. Using the criteria of this invention no more than a ten percent reduction in pin cross-section under the last engaged thread will result. This is acceptable. Also, the root radius should not be increased to a point which is greater than a distance which would intersect or exceed the pitch diameter. This condition is shown in FIG. 10 and represents the limiting condition of enlargement of root diameter. The limit of enlarged root diameter, which is shown in FIG. 10, is difficult to use in practice since it would tend to produce an undercut area 36 which would make it difficult to use standard cutting tools which move in a plane normal to the thread axis. It would be possible, of course, to use this limit of radius with standard tools if the undercut area were eliminated and a flat surface introduced, as indicated by the dotted line 37. It should be noted that one-half the distance along a line extending normally to the load flank and passing through the pitch diameter at the unloaded flank is considered to be the limit of increase in root radius since a further increase in root radius would change the thread configuration above the pitch diameter and thus make the threads incompatible with a standard API box thread. The pitch diameter represents the depth of penetration of the standard API thread gage and as long as the thread configuration above the pitch diameter matches an API gage, the thread will mate with a standard API box thread. Also, the original thread shear area (base width of the thread form) preferably is not reduced by more than twenty-five percent. Joining the unloaded flank to the thread root by the surface 35 will accomplish this objective. The modification of the thread below the pitch diameter line has the effect of reducing stress concentrations in the thread root 22 without interfering with the thread fit with the standard API box thread.

The thread configuration of this invention may be used at any point along the pin threads. Any full or complete thread formed in accordance with this invention should give improved results. As the stress failure usually occurs in the last engaged thread it is preferred that the last engaged thread employ the new thread form. It is further preferred that the entire pin thread system utilize the new thread form as this should reduce the maximum stresses occurring in the thread root along the entire pin. Further, as the base width of the thread form is reduced the threads are not as stiff as standard API threads. This permits relief of the more highly loaded threads and redistribution of the load among the several threads. Thus the high loading of the first threads may be reduced.

Figure 11:
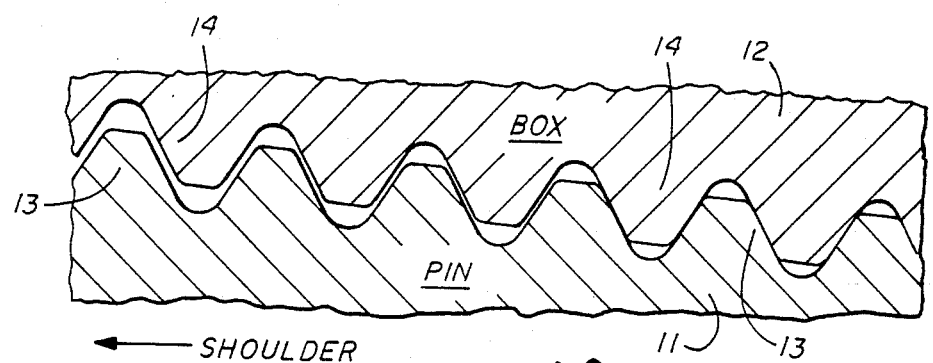
FIG. 11 is a sectional view of a box and pin threaded connection showing the fitting of the threads at the beginning of the loading conditions.
Figure 13:
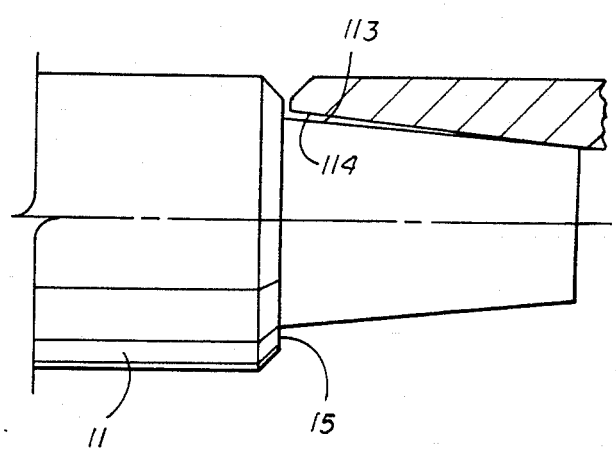
FIG. 13 is a view in elevation of a pin blank and fragment of a box blank showing the different taper of the threads.

A further change in thread design relates to the distribution of loading linearly along the threads. As previously noted, the load carrying distribution of a standard API thread form in a fully made up condition localizes about sixty percent of the load on the first three threads. As previously noted, this is the region where most of the fatigue failure occurs. In this invention, the taper of the base cone 113 on which the male thread of pin 11 is formed is decreased relative to the box, as shown in FIG. 13. The taper of pin at 113 is less than the taper 114 of the box. This results in an artificial change in pitch which causes the threads remote from the shoulder to become loaded before the threads near the shoulder become loaded when the joint is fully made up. In the standard API thread used as an example (NC46), the pin taper is 2.000 inches (plus 0.030, minus 0.000) per foot. In the preferred modified thread design of this invention, the taper is 1.925 inches (plus 0.006, minus 0.000) per foot. In this modified taper, the end threads (i.e. at the tapered end) of the pin member become loaded before the threads near the shoulder when the joint is made up. The initial loading condition is shown in FIG. 11 where the threads at the extreme end away from the shoulder are in a loaded condition and the threads carry a reduced load for some distance back toward the shoulder of the pin member. The clearance between pin threads 13 and box threads 14 at the left end of FIG. 11 is exaggerated for clarity of illustration. The actual clearance is so small that it would not show in a drawing of this type but is sufficient to produce a reduced load condition on those threads. While the pin taper could be reduced to a value just above the taper which would result in plastic flow, a reduction of no more than ten percent, i.e., 1.80 inches per foot in the above example, is believed sufficient to obtain the objects of this invention.

Figure 12:
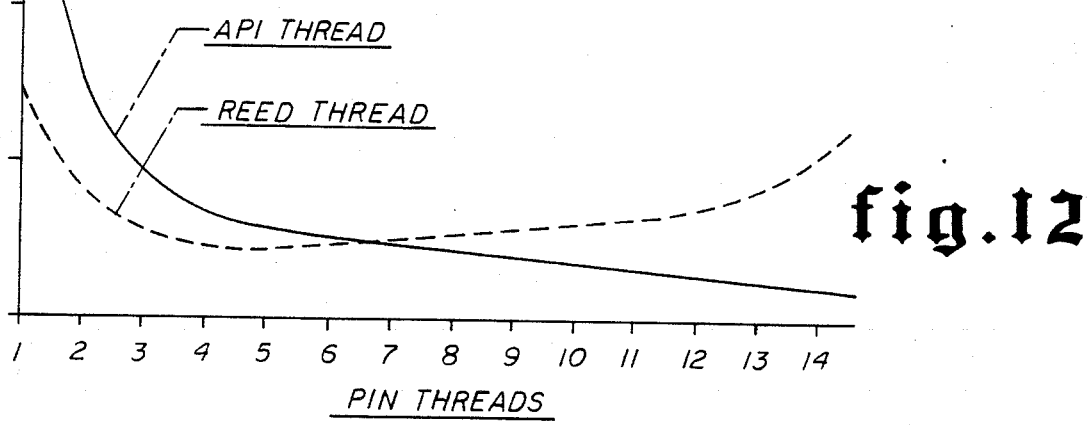
FIG. 12 is a theoretical graph of stress distribution curve showing the distribution of stresses by pin thread number as measured from the pin shoulder for the standard API thread and the thread produced in accordance with the preferred embodiment of this invention.
Figure 14:
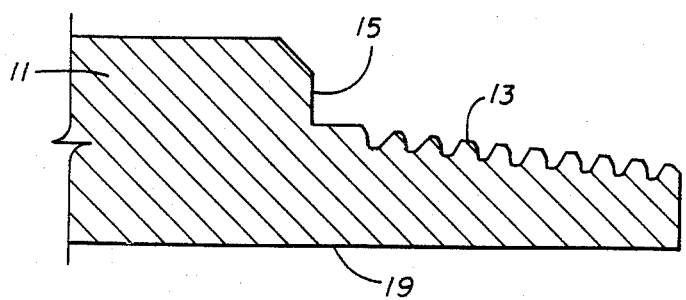
FIG. 14 is a sectional view on a threaded pin showing both the taper and the relieved root construction of the thread.

In FIG. 12 there is shown a calculated load distribution curve for the modified thread of this invention superimposed over the load distribution curve for a standard API thread. The standard API thread is shown in solid line where the thread of this invention is shown in dotted line labeled Reed thread. It is seen that the modified thread form has a lower proportion of load carried on the first six threads than is carried on the corresponding threads of an API thread form. The threads ranging from thread number seven to the end of the pin carry a substantially higher load than the corresponding API thread. This obviously results in a much more even distribution of stresses along the length of the thread. The modified thread is shown in FIG. 14 which illustrates both the relieved root structure of the thread and the taper of the threaded pin.

It will be apparent from the above that the modified geometry of FIGS. 9 and 10 may be utilized with and without the use of different tapers of the pin and box. Also, the different tapers may be utilized without the modified thread profile geometry. The use of the modified tapers will prove useful in formations which usually give problems of over-torquing joints. For instance, in tests of standard API and the illustrated joint utilizing a two inch taper box and comparing a two inch tapered pin with a 1.925 inch tapered pin it was found that the decreased taper pin required a minimum of four thousand foot pounds of torque to reach shoulder engagement as compared to one thousand for the two inch tapered pin. Thus the joint is able to withstand more severe conditions without over-torquing as this force must be overcome in addition to the usual forces induced by making up the shouldered joint. For example, one standard joint may be made up with seventeen thousand foot pounds of force. With the 1.925 tapered pin the joint may be made up with approximately an additional three thousand foot pounds of force to provide the same shoulder engagement. Additionally, the joint will be improved by redistributing the load through the threads to reduce the stress load at the last engaged thread of the pin.

Theoretical studies indicated that the maximum stress load at the last engaged thread should be reduced about thirty percent with a minimum of about twelve percent of the reduction due to the new thread profile geometry. Actual test with the pin of FIG. 9 having a reduced taper of 1.925 and a root radius of 0.057 inches made up with 17,000 foot pounds of torque showed a decrease in maximum stress of about twenty percent as compared to the standard API V.038 thread form. This test was made with strain gauges and measured an average value in the small root area covered by the gauge. This confirmed the calculated values.

The modified thread design described above has used a standard API thread for purposes of illustration. It should be obvious to those skilled in the art that the principles of modification of the thread can be applied to other standard or nonstandard thread designs. The basic elements of the thread design which result in lower stress at the thread root and more uniform stress distribution are the enlargement of the root radius and the reduction of the pin taper to cause an artificial change in pitch and a radial interference starting from the threads remote from the shoulder. In any particular case the thread has the root radius enlarged as far as possible without removing sufficient metal to weaken the pin and without enlarging the radius to the point that the thread configuration is modified above the pitch diameter. The taper of the thread is slightly reduced to produce the desired loading effect. If the principles of thread design discussed above are to be applied to other types of threads, it is merely necessary to use those principles in designing the thread cutting die.

While this invention has been described fully and completely with special emphasis upon a single preferred embodiment, it should be understood that within the scope of the appended claims the invention may be practiced otherwise than as specifically described herein.

What is claimed is:

1. A tool joint pin comprising:
   a tapered pin member having an external V-configuration truncated standard thread, said standard thread having at least its last thread away from the end of the pin provided with a root cut on a radius which is greater than the truncation of the standard thread root and less than one-half the distance along a line extending perpendicular from the load flank to the pitch diameter of the opposed unloaded flank, and said loaded flank being tangent to said root at their point of juncture, said root radius terminating on the unloaded flank side of the thread centerline and short of a plane parallel to the thread centerline and passing through the unloaded flank pitch diameter, and said termination of said root radius being connected to the unloaded flank by a surface diverging outwardly from a plane through said termination of said root radius and parallel to said thread centerline.

2. A tool joint pin comprising:

a tapered pin member having an external V-configuration truncated thread having its last engaged thread provided with a root cut on a radius which is greater than the truncation of the thread root and less than one-half the distance along a line extending perpendicular from the load flank to the pitch diameter of the opposed unloaded flank, said loaded flank tangent to said root at their point of juncture, said root radius terminating on the unloaded flank side of the thread centerline and short of a plane parallel to the thread centerline and passing through the unloaded flank pitch diameter, and said termination of said root radius connected to the unloaded flank by a surface diverging outwardly from a plane through said termination point and parallel to said thread centerline.

3. The tool joint pin of claim 1 or 2 in combination with:

a box joint having compatible threads, said pin and box having engaging shoulders limiting make up of the joint, said pin thread formed on a lesser taper than said box thread whereby the percentage of total load carried by said last thread of the pin is reduced.

4. A tool joint pin comprising:

a tapered pin member having an external V-configuration truncated thread with its root cut on a radius which is greater than the truncation of the thread root and less than one-half the distance along a line extending perpendicular from the load flank to the pitch diameter of the opposed unloaded flank, and said loaded flank being tangent to said root at their point of juncture.

5. A tool joint comprising:

a tapered pin member having an external V-configuration truncated thread with its root cut on a radius which is greater than the distance along a line extending perpendicular to the load flank of a tooth to the central axis of the thread and less than one-half the distance along a line extending perpendicular from the load flank to the pitch diameter of the opposed unloaded flank, said loaded flank being tangent to said root at their point of juncture, said root radius terminating on the unloaded flank side of the thread centerline and short of a plane parallel to the thread centerline and passing through the unloaded flank pitch diameter, and said termination of said root radius being connected to the unloaded flank by a surface diverging outwardly from a plane through said termination of said root radius and parallel to said thread centerline.

6. The tool joint pin of claim 4 or 5 in combination with:

a box joint having compatible threads, said pin and box having engaging shoulders limiting make up of the joint, and said pin thread formed on a lesser taper than said box thread whereby the percentage of total load carried by the last engaged thread of the pin is reduced.

7. A tool joint pin comprising:

a tapered pin member having an external V-configuration truncated thread having at least one complete thread provided with a root cut on a radius which is greater than the truncation of the thread root and less than one-half the distance along a line extending perpendicular from the load flank to the pitch diameter of the opposed unloaded flank, and said loaded flank being tangent to said root at their point of juncture.

* * * * *